United States Patent [19]

Huddleston et al.

[11] Patent Number: 4,801,346

[45] Date of Patent: Jan. 31, 1989

[54] PROTECTIVE COATINGS

[75] Inventors: Elwyn Huddleston, Franklin, Ky.; Jerry M. Serra, Chelmsford, Mass.; Gary R. Robe, Franklin, Ky.

[73] Assignee: The Kendall Company, Boston, Mass.

[21] Appl. No.: 892,156

[22] Filed: Jul. 30, 1986

[51] Int. Cl.$^4$ ............................................. B65H 81/02
[52] U.S. Cl. ................................ 156/187; 138/DIG. 6; 427/156; 427/409; 428/35.9
[58] Field of Search ............... 524/476, 505; 427/409, 427/300, 327, 156; 428/36; 56/187

[56] References Cited

U.S. PATENT DOCUMENTS

| | | | |
|---|---|---|---|
| 3,932,327 | 1/1976 | Naylor | 524/476 |
| 3,987,002 | 10/1976 | Lakshmanon | 523/201 |
| 3,991,002 | 11/1976 | Sadlo | 524/476 |
| 4,213,486 | 7/1980 | Samour et al. | 428/36 |
| 4,399,249 | 8/1983 | Bildusas | 524/476 |
| 4,514,445 | 8/1985 | Hokamura et al. | 427/409 |
| 4,535,526 | 8/1985 | Zerfass et al. | 428/36 |
| 4,587,289 | 5/1986 | Comert et al. | 524/505 |
| 4,606,953 | 8/1986 | Suzuki et al. | 428/36 |
| 4,618,213 | 10/1986 | Chen | 524/476 |
| 4,640,730 | 2/1987 | Streets et al. | 524/505 |

FOREIGN PATENT DOCUMENTS 57-109644  7/1982  Japan ..................................... 428/36

*Primary Examiner*—Allan M. Lieberman
*Attorney, Agent, or Firm*—Alvin Isaacs

[57] ABSTRACT

Novel storage coating for metal objects such as pipes comprising: a di- and/or triblock copolymer thermoplastic rubber consisting of polystyrene blocks and rubbery polymer blocks; a saturated hydrocarbon tackifying resin; and a hydrocarbon solvent. Preferably, the coating also contains an ultraviolet light absorber.

12 Claims, No Drawings

PROTECTIVE COATINGS

BACKGROUND OF THE INVENTION

The invention relates to novel protective coatings for metal objects, and more particularly, to novel coating compositions for protecting metal objects from corrosion and/or other degradation during storage prior to the contemplated usage. Since the invention is primarily directed to metal pipes, it wil be described hereinafter for purposes of illustration by reference thereto.

Metal pipes such as those contemplated for inground implantation require an anti-corrosion protective system. Typically, such a system consists essentially of a rubber-based primer coating over which a rubber-based, pressure-sensitive adhesive tape is spirally wound. Such an anti-corrosion system is generally referred to in the art as pipewrap.

In the art of laying pipeline, whether in ground or above ground, the pipes generally lie in storage for a period of time, which may be as much as a year or more, prior to application of the pipewrap or other protective system. This storage may, for example, be outdoors at the time of manufacture, at the site of use, or a combination of both.

During the time of storage, it will be appreciated that the pipes also require protections from degradative forces, which protection need not be as long-lasting as the protective system ultimately applied, i.e. it need only serve its protective function for the time in storage.

In general, storage coatings currently available have a protective life on the order of six months. However, pipes delivered to the field frequently remain in storage for considerably longer periods of time, say, for example, a year or more.

The task of this invention, therefore, is to provide a storage coating for metal objects, particularly pipes or the like, which will provide protection for extended periods of time and which preferably are characterized as being easy to apply, dry quickly to a substantially tack-free condition and, if not completely removed prior to use, are compatible with the protective coating which will ultimately be placed thereover.

BRIEF DESCRIPTION OF THE INVENTION

In accordance with the present invention, this task is solved by providing a liquid coating composition comprising (1) a di- and/or triblock thermoplastic rubber comprising a copolymer having polystyrene blocks and rubbery polymer blocks; (2) at least one saturated hydrocarbon tackifying resin; and (3) a hydrocarbon solvent. It preferably also contains an ultraviolet absorber.

DETAIL DESCRIPTION OF THE INVENTION

Metal pipelines such as those contemplated for inground implantation are conventionally protected before placement by applying an anti-corrosion system. In a typical system of this description, the pipe surface is first cleaned, e.g. by shot blasting, and then a rubbery primer coat is applied. Finally, an adhesive tape is spirally wound over the thus coated pipe. Irrespective of the nature of the particular compositions employed, it will be appreciated that they must be compatible in the sense that they must adhere together well and not loosen or peel away, particularly under the severe long-term shearing forces derived from the surrounding soil.

A typical primer coating of this description will, for example, comprise a mixture containing natural rubber and a tackifier to increase adhesion. A typical adhesive tape compatible therewith will comprise a polyolefin backing material carrying, on one surface thereof, an adhesive composition comprising a blend of synthetic rubbers (e.g. butyl rubbers) and at least one tackifier. The respective coatings may and usually will contain other materials performing specific desired functions, e.g. fillers, antioxidants, biocides, and the like.

At the completion of the storage period, the storage coating may, if desired, be removed from the pipe or other object by per se known means. However, since the removal requires both time and labor, it should preferably at most only be partially removed, in which case the permanent protective system would be applied thereover. As the primer must be compatible with the overlying tape so as to provide the requisite adhesion, in like manner, any storage coating applied to the pipe and which is not thereafter removed should be compatible with the primer or other anti-corrosion coating to be applied thereover at a subsequent time.

Accordingly, in its broadest aspect, the present invention is directed to novel storage coatings for metal objects which will afford the necessary protection from corrosion for extended periods of time, e.g. on the order of a year or more. In a more specific aspect, the invention is directed to storage coatings providing the aforementioned protection and which are compatible with a rubber-based protective system to be applied thereover at the time of installation or use and accordingly need not be completely removed prior to applying the rubber-based protective system.

In accordance with the present invention, a preferred storage coating meeting the foregoing prerequisites will comprise: (1) from about 35 to about 53 percent by weight of a di- and/or triblock thermoplastic rubber polymer having polystyrene blocks and rubbery polymer blocks; (2) 35 to 53 percent by weight of a saturated hydrocarbon tackifying resin; (3) an effective amount of an ultraviolet (UV) light absorber; and (4) from about 1.0 to about 2.0 liters/kg. of a hydrocarbon solvent, the above proportions being based on the total weight of the aforementioned solids.

As examples of useful rubber block polymers, mention may be made of those of the "Kraton G" series (trademark of Shell Chemical Company for a series of mainly triblocks characterized as being two-phase polymers consisting of polystyrene domains in a rubbery polyethylene-butylene) matrix.) Since these triblocks have polystyrene end blocks and a poly(ethylene-butylene midblock, they are generally abbreviated as "SEBS". Illustrative examples of thermoplastic rubbers of the "Kraton G" series and their styrene/rubber ratio include G-1650(28/72); G-1651(33/67); G-1652(29/71); G-1657(14/86); and G-4609(33/67).

Useful saturated hydrocarbon tackifying resins, whose purpose is to increase adhesion, include phenolic-modffied terpene resins, e.g. Piccofyn A-135 (Hercule Chemical) coumarone resins, e.g. coumarone-indene resins such as "Coumar LX-509" (trademark of Neville Chemical Company), and the like.

The novel coatings of this invention may also include a UV absorber to provide stability in the presence of UV radiation. Since the amount required for this stabilizing function will be dependent at least in part upon the effectiveness of the particular reagent selected, it is accordingly not capable of precise quantitative definition. Accordingly, the amount as recited in the appended claims is defined as an "effective amount," meaning an amount sufficient to provide the desired protection from UV during the projected storage life. It will of course be appreciated that the selection of operative amounts of a given UV absorber will be readily understood by those skilled in the art and may be confirmed routinely by per se known accelerated aging tests.

While useful UV absorbers may be selected from the known classes of organic UV absorbers, from the standpoint of cost and availability, carbon black, is preferred. An effective amount of carbon black will be on the order of from about 4 to about 13% by weight.

Finally, the novel storage coatings of this invention include a hydrocarbon solvent for the rubber block polymer e.g. toluene alone or in combination with other solvents such as heptane, isoparaffins such as "Isopar B" (trademark of Exxon Company), etc.

In general, the storage coatings may be readily prepared by mixing in the presence of heat.

While employing carbon black, it is preferably first admixed with the block polymer, e.g. as a 8:92 to 30:70 dispersion of carbon black to polymer.

The following examples show by way of illustration and not by way of limitation the preparation of the novel storage coating compositions contemplated by this inventor.

EXAMPLE 1

The following materials were mixed for about three hours while heating in a steam jacket:
20:80 mixture of carbon black 400 lbs. and "Kraton G 1652":
"Cumar XL-509 Resin": 320 lbs.
"Isopar B": 291 gal.
"Toluene": 69 gal.

Tests on pipes coated with the above storage coating in such diverse places as Arizona, Texas, Florida, Japan, Australia and Utah over periods as long as 18 months have revealed no changes.

EXAMPLE 2

92:8 mixture of Kraton G 1652 and 1780 gms. carbon black:
"Piccofyn A 135": 1244 gms.
0:20 heptane/toluene: 10 gals.
to make a coating composition calculated to contain 10% solids.

EXAMPLE 3

Example 2 was repeated, substituting "Kraton G 1650" for "Kraton G 1652."

Samples of two inch blasted (cleaned pipe were spray-coated with each of the formulations prepared in Example and 3 and then stored on the roof of a building in Kentucky with uull exposure to the sun and elements. After more than 3 years, no change was observed.

We claim:

1. A method for protecting a metal article from corrosion comprising coating said article with a liquid coating composition comprising: (1) a triblock thermoplastic rubber comprising a copolymer having polystyrene end blocks and a poly(ethylene-butylene) rubber midblock; (2) at least one tackifying resin selected from the group consisting of phenolic-modified terpene resins and coumarone-indene resins; and (3) a hydrocarbon solvent for said copolymer.

2. A method as defined in claim 1 wherein said composition includes an ultraviolet light absorber.

3. A method as defined in claim 2 wherein said ultraviolet light absorber is carbon black.

4. A method as defined in claim 1 wherein said composition contains from about 35 to about 53 percent of said copolymer, by total weight of solids in said composition.

5. A method as defined in claim 4 wherein said composition contains from about 35 to about 53 percent tackifying resin by total weight of solids in said composition.

6. A method as defined in claim 1 wherein said solvent comprises a mixture of solvents.

7. A method as defined in claim 6 wherein said solvent mixture includes an isoparaffin.

8. A method as defined in claim 1 wherein said copolymer has a styrene: ethylene-butylene ratio of from about 14:86 to about 33:67.

9. A method as defined in claim 1 including the steps of removing said coating composition at some time after it is coated onto said metal article; and thereafter applying to said metal article and any of said coating composition remaining thereon a rubber-based adhesive coating containing natural rubber and a tackifier.

10. A method as defined in claim 9 wherein said metal article is a pipe.

11. A method as defined in claim 10 including the step of applying a protective adhesive tape over said rubber-based adhesive coating.

12. A method for protecting metal pipes which are intended to be stored for a period of time prior to being laid, said pipes being subjected to degradative environmental forces both during said period of storage and after it is laid, said method comprising the steps of:
(1) applying to the surface of said pipe prior to said storage period a liquid storage coating composition comprising
    (a) a triblock thermoplastic rubber comprising a copolymer having polystyrene end blocks and a poly(ethylene-butylene)rubber midlock;
    (b) at least one tackifying resin selected from the group consisting of phenolic-modified terpene resins and coumarone-idene resins; and
    (c) a hydrocarbon solvent for said copolymer;
(2) after said storage period and prior to laying said pipe, removing said storage coating;
(3) applying a rubber-based primer coating of natural rubber and a tackifier on the surface of said pipe and any remaining storage coating;
(4) and thereafter applying an adhesive pipewrap of a polyolefin material carrying on one surface thereof an adhesive composition of a blend of synthetic rubbers and at least one tackifier, over said primer coating.

* * * * *